L. Van Wie.
Potato Planter.

Nº 91,798.      Patented Jan. 22, 1869.

Witnesses:

Inventor:
Lansing Van Wie
Chipman, Hosmer & Co
attys

United States Patent Office.

LANSING VAN WIE, OF BETHLEHEM, NEW YORK.

Letters Patent No. 91,798, dated June 22, 1869.

IMPROVEMENT IN POTATO-PLANTER.

The Schedule referred to in these Letters Patent and making part of the same.

*To all whom it may concern:*

Be it known that I, LANSING VAN WIE, of Bethlehem, in the county of Albany, and State of New York, have invented a new and valuable Improvement in Potato-Cutters, Planters, Coverers, and Rollers; and I do hereby declare that the following is a full, clear, and exact description of the construction and operation of the same, reference being had to the annexed drawings making a part of this specification, and to the letters and figures of reference marked thereon.

Figure 1:
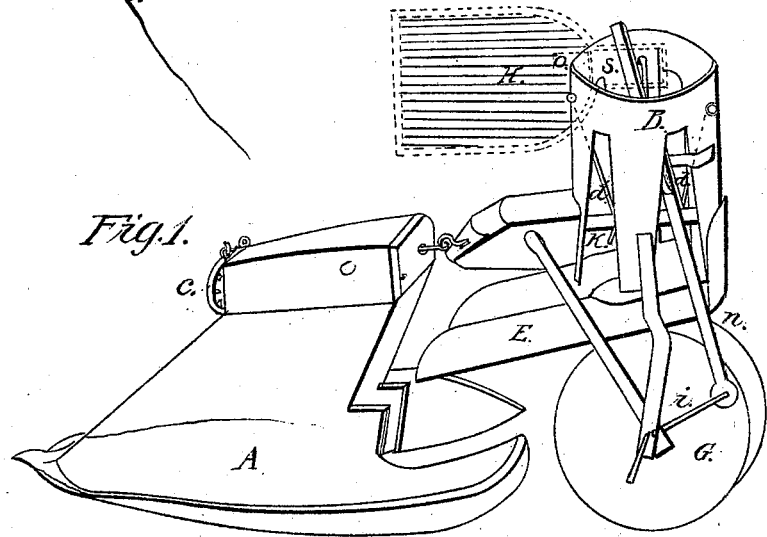

Figure 1, of the drawings, is a plan view of my invention.

Figure 2:
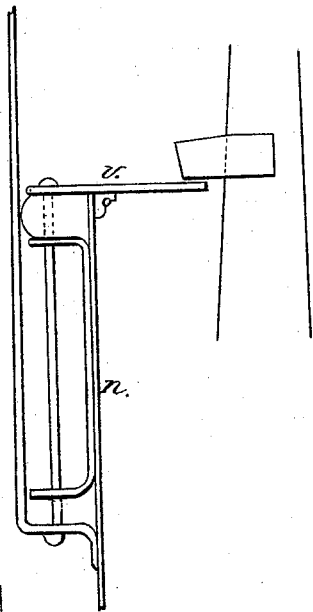
Figure 3:
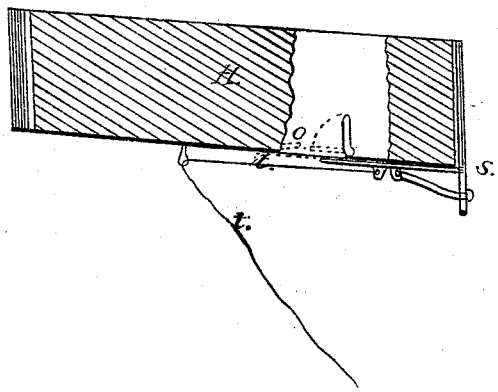

Figures 2 and 3 are details.

My invention relates to machines for planting potatoes; and

It consists in the construction and novel arrangement of devices by which potatoes may be cut, dropped, planted, and covered by one continuous operation.

My invention is susceptible of use with or without the cutting-apparatus.

The letter A, of the drawings, represents a plow, constructed in an oblong shoe-form, and having its outer edges turned upward, as shown. The team to draw the apparatus is attached by a suitable clevis at the point c.

The letter B represents a cylinder, open at top and bottom, and with slotted openings in its sides, as shown. Small wires, d, are passed from the top of this cylinder, in a diagonal position, downward, until they form a species of basket, to guide the potatoes downward to the knife, hereafter mentioned, and to the spout by which they are conducted to the ground.

The letter h represents a knife, passing across the cylinder B, near its bottom, which is intended for cutting the potatoes in halves, when it is desirable so to do.

The letter E is a spout or apron, by which the potatoes are carried downward toward the ground.

The letter G represents a roller, working under the spout above mentioned, and sustained in place by suitable braces.

The letter $i$ represents a crank, arranged in the side of the roller, and operating the lever $n$, as shown. A similar crank is connected with the opposite side of said roller, which operates the valve, that allows the potatoes to pass downward from the holder H, as hereinafter described.

The letter H represents the holder in which the potatoes are placed for planting.

I make an opening in the bottom of this holder, as shown at $o$, and place therein the sliding valve $s$.

The crank on the rear side of the roller is connected with the cord $t$, which said cord is united with the valve $s$, as shown.

The result is that at each revolution of said crank, the cord $t$ draws the valve $s$ open, and allows a single potato to pass downward from the potato-holder. The return movement of said crank serves to draw the valve $s$ backward, and close the opening $o$.

The lever $n$ has an arm, $v$, arranged upon it, as shown on fig. 2, which arm, at each revolution of the roller, is drawn downward, thereby forcing a potato upon the knife $h$.

The holding, dropping, cutting, and rolling-devices above described, are connected with the plow and coverer in the manner shown on fig. 1.

The peculiar shape given to the plow makes it subserve the purpose of a coverer as well as a plow.

What I claim as my invention, and desire to secure by Letters Patent, is—

The machine above described for dropping, cutting, covering, and rolling potatoes, at one continuous operation, constructed substantially as described.

In testimony that I claim the above, I have hereunto subscribed my name, in the presence of two witnesses.

LANSING VAN WIE.

Witnesses:
 EDW. G. SHERLEY,
 PETER PRIBER.